United States Patent [19]

Shirai et al.

[11] Patent Number: 5,759,313

[45] Date of Patent: Jun. 2, 1998

[54] PNEUMATIC TIRE HAVING V-SHAPED SUBGROOVES

[75] Inventors: Kenichi Shirai; Toshihiko Suzuki, both of Hiratsuka, Japan

[73] Assignee: The Yokohama Rubber Co., Ltd., Tokyo, Japan

[21] Appl. No.: 637,214

[22] Filed: Apr. 24, 1996

[30] Foreign Application Priority Data

Jul. 11, 1995 [JP] Japan .................... 7-175141

[51] Int. Cl.⁶ .................. B60C 3/00; B60C 9/18; B60C 115/00
[52] U.S. Cl. .................. 152/209 R; 152/209 D; 152/454; 152/526; 152/527; 152/536
[58] Field of Search .................. 152/209 R, 209 D, 152/454, 526, 535, 531, 538

[56] References Cited

U.S. PATENT DOCUMENTS

| D. 365,071 | 12/1995 | Hamamoto et al. | D12/149 |
|---|---|---|---|
| 2,605,807 | 8/1952 | Wittmer | 152/209 R |
| 3,584,670 | 6/1971 | Verdier | 152/209 R |
| 4,044,810 | 8/1977 | Taniguchi et al. | 152/454 |
| 4,258,769 | 3/1981 | Makino et al. | 152/209 R |
| 4,481,991 | 11/1984 | Pieper | 152/209 R |
| 4,572,261 | 2/1986 | Binsfeld | 152/209 R |
| 4,649,975 | 3/1987 | Kogure et al. | 152/209 R |
| 4,676,290 | 6/1987 | Tansei et al. | 152/209 R |
| 5,222,537 | 6/1993 | Saito et al. | 152/454 |
| 5,240,053 | 8/1993 | Baumhofer et al. | 152/209 R |
| 5,373,885 | 12/1994 | Yamashita | 152/538 |
| 5,421,391 | 6/1995 | Himuro | 152/209 R |
| 5,435,366 | 7/1995 | Voigt et al. | D12/147 |
| 5,580,404 | 12/1996 | Hitzky | 152/209 R |

FOREIGN PATENT DOCUMENTS

| 3612081 | 10/1986 | Germany | 152/209 R |
|---|---|---|---|
| 3924017 | 3/1990 | Germany | 152/209 R |
| 125406 | 5/1988 | Japan | 152/526 |
| 36506 | 2/1989 | Japan | 152/209 D |
| 2221877 | 2/1990 | United Kingdom | 152/209 R |

*Primary Examiner*—Steven D. Maki
*Attorney, Agent, or Firm*—Nikaido, Marmelstein, Murray & Oram LLP

[57] ABSTRACT

A pneumatic tire in which sub-grooves extending at least in the widthwise direction of the tire are provided in a center portion of a tread surface and shoulder portions thereof on both sides of the center portion at a predetermined pitch, both the width and depth of the sub-grooves in the two shoulder portions being set larger than those of the sub-grooves in the center portion, a ratio of the area of the sub-grooves in the two shoulder portions to that of the tread surface being set larger than a ratio of the area of the sub-grooves in the center portion to that of the tread surface. This tire can be used with the air pressure therein set higher under the on-road travelling condition, and lower under the off-road travelling condition.

9 Claims, 4 Drawing Sheets

PNEUMATIC TIRE HAVING V-SHAPED SUBGROOVES

BACKGROUND OF THE INVENTION

This invention relates to a pneumatic tire permitting a vehicle to travel excellently both in the on-road condition and in the off-road condition without changing the tires.

In general, different types of pneumatic tires are used when a vehicle travels in the on-road condition and when a vehicle travels in the off-road condition. A pneumatic tire used for the off-road travelling purpose rotates on a wasteland, i.e., on stones, sand and mud, so that the width, depth and area ratio of sub-grooves A extending in the widthwise direction of the tire are set large as shown in FIG. 4 as compared with those of sub-grooves in a pneumatic tire for the on-road travelling purpose. Therefore, when a tire for the off-road travelling purpose is used for the on-road travelling purpose, noise increase in conformity with the larger area of the sub-grooves as compared with that occurring when a tire for the on-road travelling purpose is used. Moreover, a response of the steering wheel deteriorates, so that a driver has unpleasant feeling. Consequently, when a tire for the off-road travelling is used for the on-road travelling purpose, a great decrease mentioned above in the on-road performance thereof cannot be avoided.

On the other hand, the width, depth and area ratio of sub-grooves A extending in the widthwise direction of a tire used for the on-road travelling purpose are set smaller than those of the sub-grooves in a tire for the off-road travelling purpose as shown in FIG. 5. Accordingly, when a vehicle with tires of FIG. 5 set thereon is used for the on-road travelling purpose, the level of noise becomes lower than that of noise occurring when an off-road tire is used for the same purpose, and a response of the steering wheel is excellent. However, it becomes difficult to carry out the off-road travelling purpose.

Under the circumstances, it has strongly been demanded that a pneumatic tire permitting a vehicle to travel both in the on-road condition and in the off-road condition without any troubles with the tire left unchanged in changed travelling condition be proposed.

Referring to FIGS. 4 and 5, a reference letter B denotes a plurality of primary grooves extending in a circumferential direction T of a tire, and a reference letter C denotes blocks defined by these primary grooves 3 and sub-grooves A.

SUMMARY OF THE INVENTION

An object of the present invention is to provide a pneumatic tire capable of making compatible the on-road performance thereof with the off-road performance thereof without causing a great decrease in the same on-road and off-road performance.

To achieve this object, the present invention provides a pneumatic tire, wherein sub-grooves extending at least in the widthwise direction of the tire are arranged in the circumferential direction thereof at a predetermined pitch in a center portion of a tread surface and both of shoulder portions thereof on both sides of the center portion, characterized in that both the width and depth of the sub-grooves in both of the shoulder portions are set larger than those of the sub-grooves in the center portion, a ratio of the area of the sub-grooves in both of the shoulder portions to that of the tread surface being set larger than a ratio of the area of the sub-grooves in the center portion to that of the tread surface.

The inventors of the present invention have earnestly studied the influence of a tread surface of a tire upon the on-road travelling and off-road travelling of a vehicle. As a result, it has been ascertained that a center portion of a tread surface has large influence upon the on-road travelling of a vehicle, and that shoulder portions of a tread surface have larger influence upon the off-road travelling of a vehicle. Accordingly, in the present invention, conventional sub-grooves for the on-road travelling purpose which have small width, depth and area ratio are provided in the center portion of a tread surface, while conventional sub-grooves for the off-road travelling which have large width, depth and area ratio are provided in the shoulder portions thereof. Therefore, this tire enables the noise occurring during the on-road travelling of a vehicle to be reduced to a level lower than that of the noise occurring when a conventional tire for the off-road travelling purpose is used for the on-road travelling purpose, a response of a steering wheel to be improved, and the travelling of a vehicle on a wasteland, i.e., on stones, sand and mud to be effected with the tire left unchanged.

DESCRIPTION OF THE PREFERRED EMBODIMENTS

Figure 1:
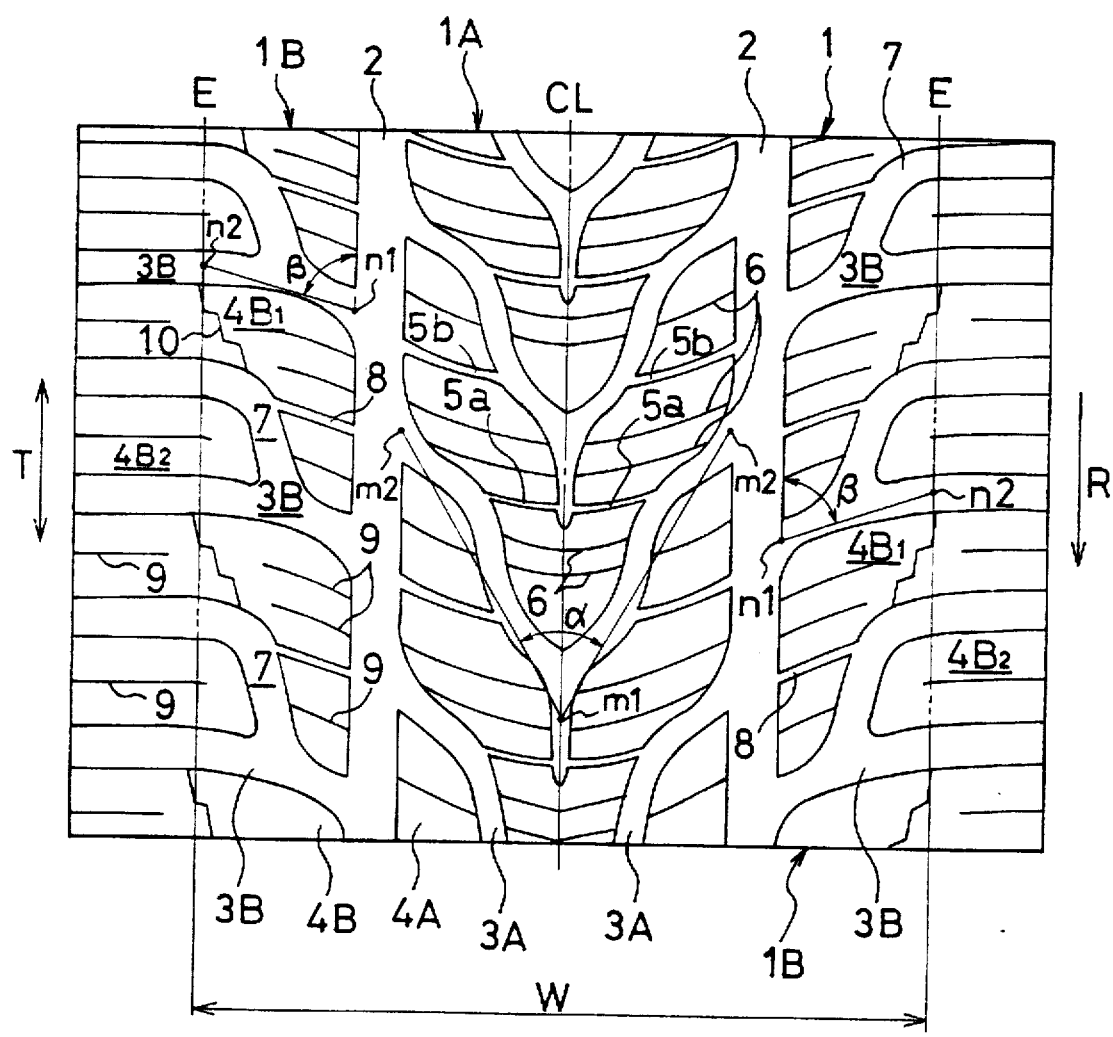
FIG. 1 is a development elevation of a principal portion of a tread surface showing an example of the pneumatic tire according to the present invention.

Referring to FIG. 1, a reference numeral 1 denotes a tread surface, on which two straight primary grooves 2 extending in the circumferential direction T of the tire are provided symmetrically with respect to a center line CL of the tire. These two primary grooves 2 divide the tread surface 1 into a center portion 1A between the same grooves 2, and two shoulder portions 1B on the outer sides of the primary grooves 2 i.e., in the outer regions of the tire.

In the center portion 1A of the tread surface 1, sub-grooves 3A extending in the widthwise direction of the tire and over the whole distance between the primary grooves 2 are provided at a predetermined pitch in the circumferential direction T of the tire. These primary grooves 2 and sub-grooves 3A define a plurality of blocks 4A in the center portion 1A.

In the two shoulder portions 1B of the tread surface 1, sub-grooves 3B extending in the widthwise direction of the tire from the two primary grooves 2 toward the outer sides of the tire are provided at a predetermined pitch in the circumferential direction T of the tire. These primary grooves 2 and sub-grooves 3B define a plurality of blocks 4B in both of the shoulder portions 1B.

The sub-grooves 3A positioned in the center portion 1A are formed in the shape of the letter "V" diverging in the anti-rotational direction of the tire which is contrary to a designated rotational direction R of the tire. Accordingly, the blocks 4A provided in the center portion 1A are formed in the shape of the letter "V".

In each block 4A, narrow grooves 5a, 5b which extend between laterally adjacent members of a V-shaped sub-groove 3A and between a laterally adjacent primary groove 2 and a laterally adjacent member of a sub-groove 3A are provided so as to extend in the widthwise direction of the tire. These narrow grooves 5a, 5b divide each block 4A into five small blocks. Each small block is provided with at least one siping 6 extending in the widthwise direction of the tire and communicating at both ends thereof with the grooves.

Each sub-groove 3B positioned in both shoulder portions 1B extends from the relative primary groove 2 to an outer portion of the tire beyond a ground contacting end E thereof, and inclines so that the portion of the sub-groove 3B which is near the ground contacting end E of the tire is positioned on the anti-rotational direction side of the tire.

In both shoulder portions 1B, each sub-groove 3B has one quasi-sub-groove 7 extending therefrom in the anti-rotational direction. Each quasi-sub-groove 7 extends in the widthwise direction of the tire beyond the ground contacting end E of the tire without crossing the sub-grooves 3B as it inclines toward the outer portion of the tire in the anti-rotational direction thereof. This quasi-sub-groove 7 divides each block 4B into large and small blocks $4B_1$, $4B_2$.

In the large block $4B_1$ facing the primary groove 2, one narrow groove 8 communicating with the primary groove 2 and the quasi-sub-groove 7 is provided so as to extend in the widthwise direction of the tire, whereby each block of the blocks $4B_1$ is divided into two small blocks. Each small block of the blocks $4B_1$ and each blocks $4B_2$ are provided with at least one siping 9 extending in the widthwise direction of the tire. Each small block positioned in the anti-rotational direction of the tire in each block $4B_1$ and extending beyond the ground contacting end E of the tire is provided with one siping 10 in the portion thereof which is near the ground contacting end E. This siping 10 extends zigzag in the circumferential direction T of the tire, and communicates at both ends thereof with a sub-groove 3B and a quasi-sub-groove 7.

In the pneumatic tire according to the present invention constructed as described above, the width of the sub-grooves 3B and quasi-sub-grooves 7 in the two shoulder portions 1B is set larger than that of the sub-grooves 3A in the center portion 1A. The depth of the sub-grooves 3B and quasi-sub-grooves 7 is also set larger than that of the sub-grooves 3A in the center portion 1A. A ratio of the areas of the sub-grooves 3B and quasi-sub-grooves 7 in the two shoulder portions 1B to that of the tread surface 1 as a whole is also set larger than a ratio of the area of the sub-grooves 3A in the center portion 1A to that of the tread surface 1.

On the basis of the knowledge that the center portion 1A of the tread surface 1 and the two shoulder portions 1B thereof have great influence upon the on-road travelling and the off-road travelling respectively of a vehicle, conventional sub-grooves 3A used for the on-road travelling purpose are provided in the center portion 1A of the tread surface, and conventional sub-grooves 3B, 7 used for the off-road travelling purpose in the two shoulder portions 3B.

Since sub-grooves used for the on-road travelling purpose and having reduced width, depth and area ratio are provided in the center portion 1A of the tread surface 1 which has large influence upon the on-road travelling of a vehicle, the level of noise occurring during the on-road travelling becomes lower than that of noise occurring when conventional tires for the off-road travelling use are employed for the on-road travelling of the vehicle, and a feeling of the steering wheel is improved. Since sub-grooves used for the off-road travelling purpose and having increased width, depth and area ratio are provided in the two shoulder portions 1B of the tread surface 1 which have great influence upon the off-road travelling of a vehicle, the tire also enables the vehicle to travel on an off-road area with stones, sand and mud. Accordingly, one kind of tire permits a vehicle to run on both an on-road area and an off-road area without causing a great deterioration of its on-road performance and off-road performance to occur.

A total width of the two primary grooves 2 is preferably set in the range of 12–16% of a ground contacting width W of the tire which is represented by a distance between the two ground contacting ends E of the tire. When a ratio of a total width of the primary grooves is less than 12%, the draining performance of the tire deteriorates, and the off-road travelling performance of a vehicle as well to a level not higher than a permissible range. Conversely, when a ratio of this total width exceeds 16%, the on-road travelling performance deteriorates to a level not higher than a permissible range. Preferably, the width of each primary grove 2 is set to 6–8% of the ground contacting width W of the tire.

An angle α of the V-shaped sub-grooves 3A may be set to 50–80° (25–40° at which each of sub-groove members joined together at a bending point of these sub-grooves 3A inclines with respect to the circumferential direction of the tire) so as to secure the rigidity of the blocks 4A in the on-road travelling of a vehicle without spoiling the draining performance of the tire. An angle β (measured in the anti-rotational direction of the tire) of the sub-grooves 3B with respect to the circumferential direction of the tire is preferably set to 60–90° in view of the necessity of securing the rigidity of the blocks, which is required for the off-road travelling of a vehicle, without spoiling the draining in performance of the tire.

In the case where the V-shaped sub-grooves 3A are formed curvilinearly as shown in FIG. 1, the angle α between the two sub-groove members thereof means an angle made when a midpoint ml of the width of each sub-groove at the bending point thereof and midpoints m2 of the width of the sub-groove at both ends thereof at which the sub-groove is opened in both of the primary grooves 2 are connected by straight lines. In the case where the sub-grooves 3B are formed curvilinearly as shown in FIG. 1, the angle β means an angle made between a straight line by which a midpoint nl of the width of each sub-groove 3B at an inner end thereof at which the sub-groove 3B is opened in the relative primary groove 2 and a midpoint n2 of the width of the sub-groove 3B at the ground contacting end E of the tire are connected together, and an imaginary circumferential line of the tire.

It is preferable that the pneumatic tire of the above-described construction be used for the on-road travelling purpose by setting the air pressure higher than that employed when the tire is used for the off-road travelling purpose, and for the off-road travelling purpose by setting the air pressure lower than that employed when the tire is used for the on-road travelling purpose. For example, the air pressure can be set higher than a standard level when the tire is used for the on-road travelling purpose, and lower than the standard level when the tire is used for the off-road travelling purpose. The increasing of the air pressure when the tire is used for the on-road travelling purpose enables the center portion 1A of the tread surface 1 of the tire to be bulged outward in the diametrical direction thereof, and the ground contacting pressure of the center portion to increase. Therefore, the on-road performance of the tire can be more improved. The reducing of the air pressure when the tire is used for the off-road travelling purpose enables the both shoulder portions 1B of the tread surface 1 of the tire to be bulged outward in the diametrical direction thereof, and the ground contacting pressure of the shoulder portions to increase. Therefore, the off-road performance of the tire can be more improved.

In the above-described embodiment, two primary grooves 2 are provided so as to define the center portion 1A and two shoulder portions 1B on the tread surface 1, and such primary grooves can be provided additionally as necessary. The tread surface 1 may be provided with at least two primary grooves 2 which define the center portion 1A and two shoulder portions 1B.

Figure 2:
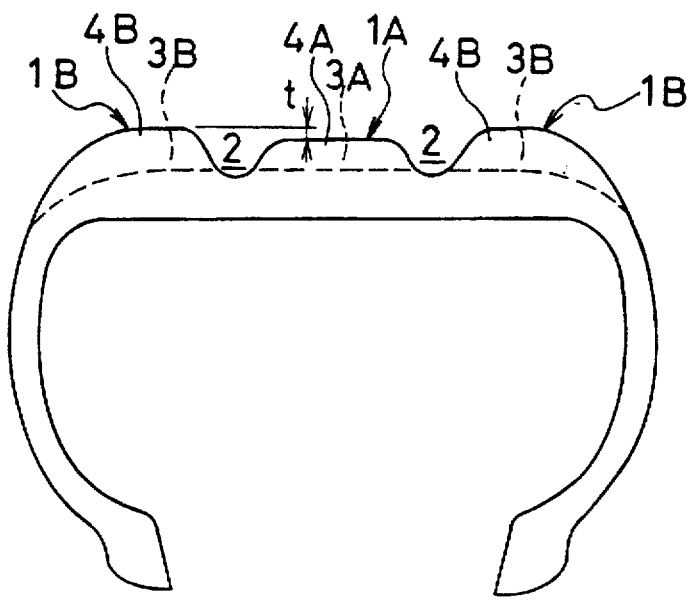
FIG. 2 is a sectioned explanatory view showing a profile of another example of the pneumatic tire according to the present invention taken along the equator thereof.

FIG. 2 shows another example of the pneumatic tire according to the present invention. This tire is formed by offsetting the center portion 1B of the tread surface 1 of the previously-described embodiment diametrically inward as compared with the shoulder portions 1B thereof. The pneumatic tire of FIG. 2 is used for the on-road travelling purpose by setting the air pressure higher than that employed when the tire is used for the off-road travelling purpose, and for the off-road travelling purpose by setting the air pressure lower conversely than that employed when the tire is used for the on-road travelling purpose. Similarly to what are mentioned above, the air pressure can be set higher than, for example, a standard air pressure when the tire is used under the on-road travelling condition, and lower than a standard air pressure when the tire is used under the off-road travelling condition.

When the tire is used by changing the air pressure therein in this manner, the center portion 1A of the trade surface 1, which is offset inward in the diametrical direction of the tire, is bulged outward in the same diametrical direction, whereby the ground contacting pressure of the center portion can be increased. Therefore, owing to the arrangement of the sub-grooves for the on-road travelling purpose formed in the center portion, the level of noise becomes lower than that of noise occurring when a conventional tire for the off-road travelling purpose is used, and a response of the steering wheel can be improved. When the tire according to the present invention is used for the off-road travelling purpose, the ground contacting pressure of the shoulder portions 1B which have influence upon the off-road travelling of a vehicle can be positively increased since the center portion 1A of the tread surface 1 is recessed inward in the diametrical direction of the tire contrariwise as compared with the above-mentioned case. Owing to the sub-grooves for the off-road travelling purpose formed in the two shoulder portions 1B, the tire enables a vehicle to travel on wasteland, i.e., on stones, sand and mud in an improved manner.

When the air pressure in the tire is low, the length of a ground contacting portion thereof increases, so that an excellent traction on an off-road can be secured. During the on-road travelling of a vehicle, the air pressure in the tire is set high, and this enables the high-speed durability of the tire to be improved. Therefore, excellent high-speed travelling performance can be secured.

An offset amount t of the center portion 1A of the tread surface is preferably not more than 3 mm. It is more preferably set to 0.5–3 mm.

Figure 3:
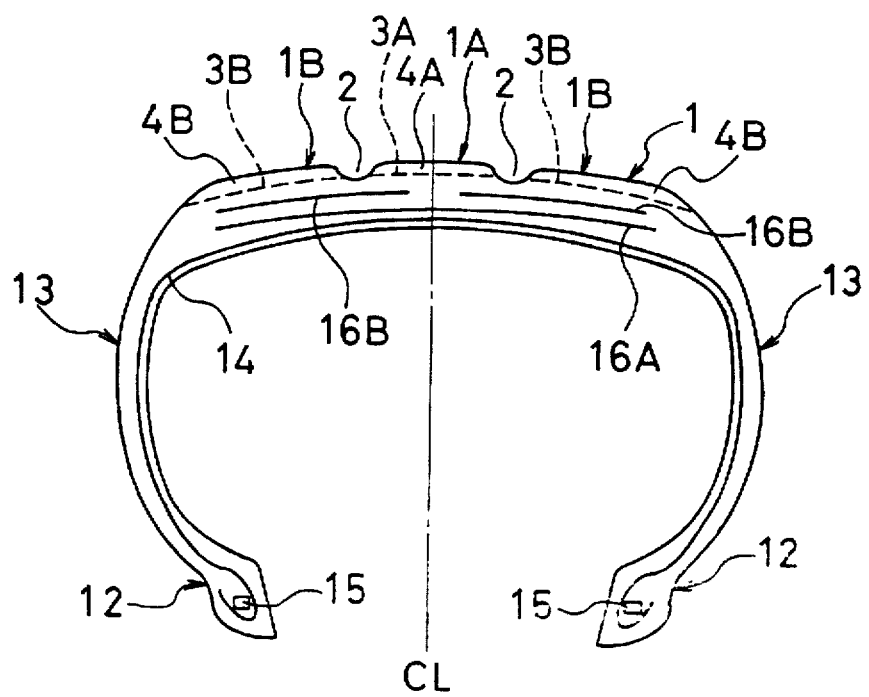
FIG. 3 is a sectioned explanatory view showing still another example of the pneumatic tire according to the present invention taken along the equator thereof.

FIG. 3 shows still another example of the pneumatic tire according to the present invention. Referring to the drawing, a reference numeral 11 denotes a tread portion, 12 bead portions, and 13 side portions. One layer of carcass 14 is provided in an inner side of the tire, and both end portions thereof are bent from the inner side to the outer side in the tire around bead cores 15 buried in the left and right bead portions 12. Two belt layers 16A, 16B are buried in the part of the tread portion 11 which is on the outer side of the carcass 14.

This embodiment is formed by adding the following structure to the above-described embodiment of FIG. 1. Namely, the inner belt layer 16A out of the belt layers 16A, 16B comprises one belt layer continuously extending in the widthwise direction of the tire, while the outer belt layer 16B has a two-split structure in which the belt layer is divided at the portion of the center region of the tire which is in the vicinity of the center line CL thereof.

In the pneumatic tire of this embodiment, the air pressure is set higher when the tire is used for the on-road travelling purpose than that set when the tire is used for the off-road travelling purpose, and lower when the tire is used for the off-road travelling purpose than that set when the tire is used for the on-road travelling purpose just as in the case of the above-mentioned embodiment in which the center portion is offset inward.

Therefore, when the tire is used for the on-road travelling purpose, the center portion 1A, which is less restrained by the belt layers, of the tread surface 1 bulges outward, so that the ground contacting pressure of the center portion 1A of the tread surface which has great influence upon the on-road travelling of a vehicle can be increased. Accordingly, an excellent on-road travelling performance can be secured. When the tire is used for the off-road travelling purpose, the center portion 1A, which is not strongly restrained by the belt layers, of the tread surface 1 is recessed, conversely, in the diametrically inward direction of the tire, so that the ground contacting pressure of the two shoulder portions 1B of the tread surface 1 which has great influence upon the off-road travelling of a vehicle can be increased. Accordingly, more improved off-road travelling performance can be obtained.

The reinforcing cords used in the belt layers 16A, 16B can comprise steel cords adopted generally in a conventional tire of this kind. Preferably, the reinforcing cords in the two-split belt layer 16B are formed out of organic fiber for the purpose of minimizing the occurrence of belt edge separation.

The organic fiber usable in the belt layer 16B includes, for example, aramid fiber, polyethylene terephthalate fiber, polyethylene 2–6 naphthalate fiber, vinylon fiber, rayon fiber, polyallylate fiber, poly-p-phenylenebenzbisoxazole fiber and poly-p-phenylenzenzbisthiazole fiber, and aramid fiber is preferably used.

A total denier of the reinforcing cords comprising such organic fiber may be set to 500–6000. When a total denier is smaller than 500, the securing of a satisfactory strength of the belt becomes difficult, and, moreover, the productivity thereof decreases. When a total denier is larger than 6000, the weight of the belt increases, and the durability thereof deteriorates.

In this embodiment, the outer belt layer 16B is divided into two but the lower belt layer 16A may be divided into two instead.

According to the present invention, in the above-described embodiments the center portion 1A of the tread surface 1 can have a range of 15 to 25% of the ground contacting width W of the tire from the center line CL of the tire to both left and right sides respectively.

In the above-described embodiments, explanations about a block pattern are given. Instead of the block pattern, a rib pattern may be provided on the center portion 1A of the tread surface 1 by arranging sub-grooves, which extend alternately from the center line of the tire toward the two primary grooves, in the circumferential direction at a predetermined pitch. The pneumatic tire may also be provided with a lug pattern in which sub-grooves extending alternately from the center line CL of the tire toward and beyond the two ground contacting ends E thereof are arranged in the circumferential direction of the tire at a predetermined pitch without the two primary grooves.

According to the present invention, the pneumatic tire may also be formed by combining the above-described embodiments of FIGS. 1, 2 and 3, whereby the compatibility of the on-road travelling performance with off-road travelling performance can be further improved.

EXAMPLE 1

Test tires of the following structure were manufactured with the tire size set to 225/55R16 in common.

Tire according to the present invention:
  Tread pattern: FIG. 1
  Width of sub-grooves in the center portion: 7 mm
  Depth of the same sub-grooves: 6.5 mm
  Area ratio of the same sub-grooves: 36%
  Width of sub-grooves in the shoulder portions: 9 mm
  Depth of the same sub-grooves: 9 mm
  Area ratio of the same sub-grooves: 43%

Figure 4:
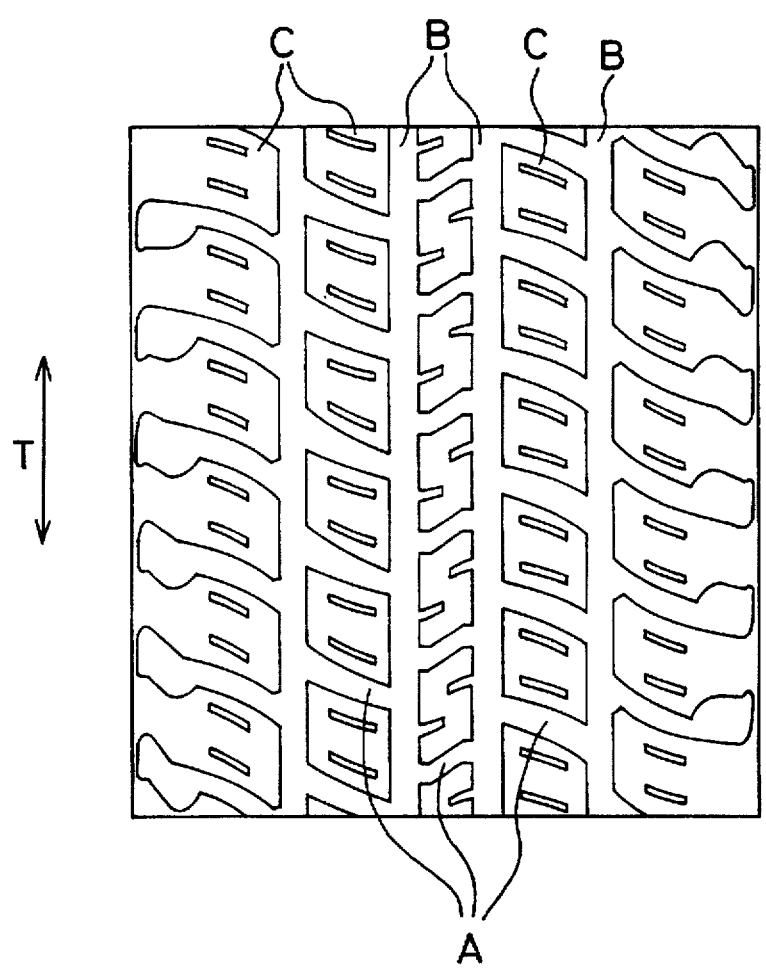
FIG. 4 is a development elevation of a principal portion of a tread surface showing an example of a conventional tire used as a tire for the off-road travelling purpose.

Conventional tire 1 (for off-road travelling purpose):
  Tread pattern: FIG. 4
  Width of sub-grooves: 8 mm
  Depth of the same sub-grooves: 8 mm
  Area ratio of the same sub-grooves: 45%

Figure 5:
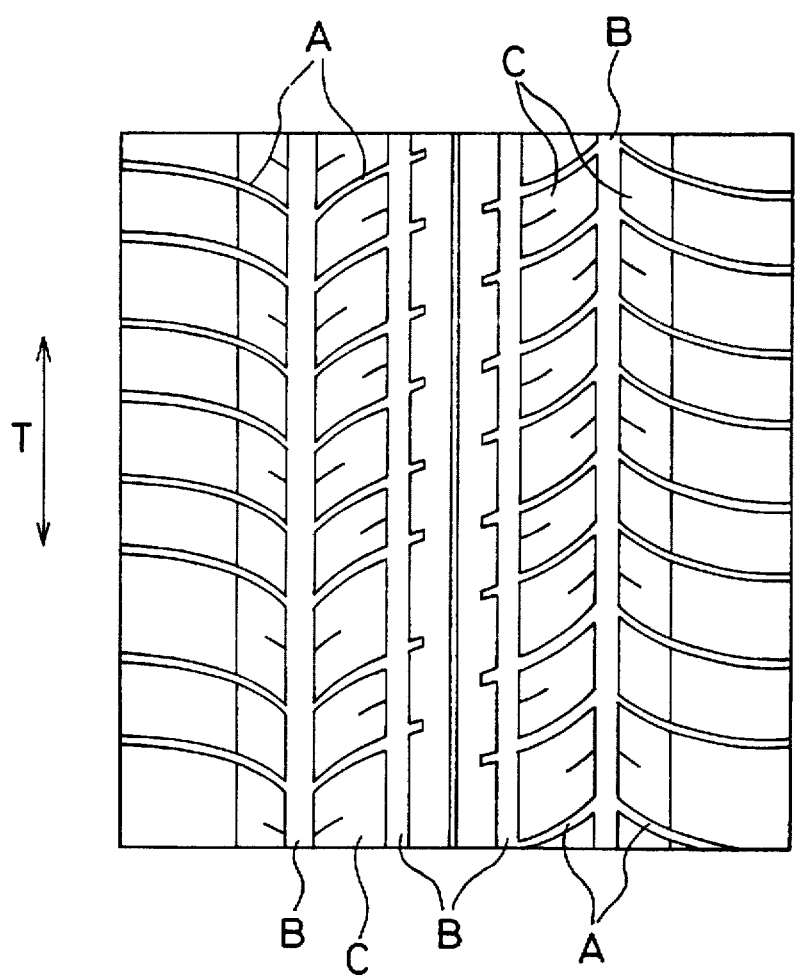
FIG. 5 is a development elevation of a principal portion of a tread surface showing an example of a conventional tire used as a tire for the on-road travelling purpose.

Conventional tire 2 (for on-road travelling purpose):
  Tread pattern: FIG. 5
  Width of sub-grooves: 6 mm
  Depth of the same sub-grooves: 6 mm
  Area ratio of the same sub-grooves: 35%

These test tires were set on rims of a size of 16×8JJ, and the resultant wheels were attached to a 2500 cc passenger car. Evaluation tests for the on-road and off-road travelling performance of the tires were conducted under the conditions shown below, and the results shown in Table 1 were obtained.

On-road performance:

The air pressure in each test tire was set to 250 kpa, and a response of the steering wheel and the feeling concerning the inside-vehicle noise were tested by test drivers on a paved test course to evaluate the on-road travelling performance of the tire. The results are shown by indexes based on 100 which represents the on-road performance of the conventional tire 2. The larger values indicate higher on-road performance.

Off-road performance:

The air pressure in each test tire was set to 150 kpa, and the travelling performance based on the feeling of test drivers was tested on a non-paved test course. The results are shown by indexes based on 100 which represents the travelling performance of the conventional tire 1. The larger values indicate the higher off-road performance.

(Table 1)

As is clear from Table 1, the on-road travelling performance and off-road travelling performance of the tire according to the present invention are all 90, and it is understood that the on-road and off-road travelling performance of the tire according to the present invention can be rendered compatible without causing the two kinds of performance to lower greatly. The "lower greatly" referred to above means that the index decreases by not less than 15 points to reach not more than 85.

EXAMPLE 2

In the above tire according to the present invention, test tires 1–5 in which a ratio (%) of a total width of two primary grooves to a ground contacting width W of a tire was varied as shown in Table 2 were manufactured. The width of each primary groove was set equal. In each test tire, both an angle $\alpha$ and an angle $\beta$ were set to 70°.

Evaluation tests for the on-road and off-road travelling performance of these test tires were conducted in the same manner as mentioned above, and evaluation tests for the draining performance of the same tires under the measuring conditions shown below. The results shown in Table 2 were obtained.

Draining performance:

Each vehicle to which each test tire was attached was travelled on a flat wet paved road surface having an average water depth of 10 mm with the speed gradually increased, and a critical speed at which a hydroplaning phenomenon occurred was measured. The results were evaluated by indexes based on 100 which represented the draining performance of the conventional tire 2. The larger values indicate higher draining performance.

(Table 2)

The following may be understood from Table 2.

When a ratio of a total width of two primary grooves defining a center portion and two shoulder portions is less than 12%, the draining performance and off-road travelling performance decrease (85) beyond a permissible range, and, when this ratio is larger than 16%, the on-road travelling performance lowers (85), a ratio of total width of the primary grooves having to be set to 12–16%.

EXAMPLE 3

In the above tire according to the present invention, test tires 6–9 in which an angle $\alpha$ of the sub-grooves in the center portion was varied as shown in Table 3 were manufactured. In each tire, a ratio of a total width of the primary grooves was 14%, and an angle $\beta$ 70°.

These test tires were subjected to evaluation tests for the on-road travelling performance, off-road travelling performance and draining performance in the same manner as mentioned above to obtain the results shown in Table 3.

(Table 3)

It is understood from Table 3 that the angle of bend $\alpha$ should be set to 50°–80°.

EXAMPLE 4

In the above tire according to the present invention, test tires 10–13 in which an angle $\beta$ of the sub-grooves in both shoulder portions was varied as shown in Table 4 were manufactured. In each test tire, a ratio of a total width of the primary grooves was 14%, and an angle $\alpha$ 70°.

These test tires were subjected to evaluation tests for the on-road travelling performance, off-road travelling performance and draining performance in the same manner as mentioned above to obtain the results shown in Table 4.

(Table 4)

It is understood from Table 4 that the angle $\beta$ should preferably be set to 60°–90°.

EXAMPLE 5

In the above tire according to the present invention, test tires 14–18 in which an offset amount t of a center portion of a tread surface with respect to two shoulder portions was varied as shown in Table 5, and a test tire 19 in which an outer belt layer out of two belt layers buried in a tread portion was formed to a two-split structure (aramid fiber was used as reinforcing cords) as shown in FIG. 3 were manufactured.

These test tires were subjected to evaluation tests for the on-road travelling performance and off-road travelling performance in the same manner as mentioned above to obtain the results shown in Table 5.

(Table 5)

It is understood from Table 5 that the compatibility of the on-road travelling performance with off-road travelling performance can be further improved owing to the offsetting of the center portion of the tread surface with respect to the two shoulder portions thereof and the forming of the belt layer to a two-split structure. It is also understood that the offset amount t should be set to not more than 3.0 mm and preferably to 0.5–3 mm.

In the present invention described above, sub-grooves used for the on-road travelling purpose in a conventional tire are provided in the center portion of the tread surface, and sub-grooves used for the off-road travelling purpose in a conventional tire are provided in both shoulder portions on the basis of the knowledge that the center portion and both shoulder portions of the tread surface have great influence upon the on-road travelling and off-road travelling respectively of a vehicle. Therefore, this tire enables noise to be reduced in the on-road travelling of a vehicle as compared with a conventional tire for the off-road travelling purpose, a feeling of a steering wheel to be improved, and a vehicle to run on wasteland, i.e., on stones, sand and mud, in a good condition without changing the tire. This tire is capable of making its on-road travelling performance compatible with off-road travelling performance without causing them to lower greatly.

TABLE 1

|  | Tire according to the present invention | Conventional tire 1 | Conventional tire 2 |
| --- | --- | --- | --- |
| On-road travelling performance | 90 | 60 | 100 |
| Off-road travelling performance | 90 | 100 | 60 |

TABLE 2

|  | Test tire 1 | Test tire 2 | Test tire 3 | Test tire 4 | Test tire 5 |
| --- | --- | --- | --- | --- | --- |
| Ratio (%) | 11 | 12 | 14 | 16 | 17 |
| On-road travelling performance | 92 | 92 | 90 | 88 | 85 |
| Off-road travelling performance | 85 | 88 | 90 | 90 | 90 |
| Draining performance | 85 | 90 | 100 | 110 | 110 |

TABLE 3

|  | Test tire 6 | Test tire 7 | Test tire 8 | Test tire 9 |
| --- | --- | --- | --- | --- |
| Angle of bend (°) | 45 | 50 | 80 | 85 |
| On-road travelling performance | 85 | 88 | 90 | 90 |
| Off-road travelling performance | 90 | 90 | 90 | 90 |
| Draining performance | 107 | 105 | 88 | 85 |

TABLE 4

|  | Test tire 10 | Test tire 11 | Test tire 12 | Test tire 13 |
| --- | --- | --- | --- | --- |
| Angle of inclination (°) | 55 | 60 | 90 | 95 |
| On-road travelling performance | 90 | 90 | 90 | 90 |
| Off-road travelling performance | 85 | 88 | 92 | 90 |
| Draining performance | 100 | 95 | 105 | 85 |

TABLE 5

|  | Test tire 14 | Test tire 15 | Test tire 16 | Test tire 17 | Test tire 18 | Test tire 19 |
| --- | --- | --- | --- | --- | --- | --- |
| Recessed amount (mm) | 0.5 | 1.0 | 2.0 | 3.0 | 4.0 | — |
| On-road travelling performance | 93 | 93 | 93 | 92 | 90 | 94 |
| Off-road travelling performance | 92 | 93 | 94 | 94 | 95 | 92 |

What is claimed is:

1. A pneumatic tire wherein sub-grooves extending at least in the widthwise direction of said tire are arranged in the circumferential direction thereof at a predetermined pitch in a center portion of a tread surface and both shoulder portions thereof on both sides of said center portion, wherein both the width and depth of said sub-grooves in both of said shoulder portions is set larger than the width and the depth of said sub-grooves in said center portion;

wherein a ratio of the area of said sub-grooves in both of said shoulder portions to that of said tread surface is set larger than a ratio of the area of said sub-grooves in said center portion to that of said tread surface;

wherein at least two primary grooves defining said center portion and said two shoulder portions of said tread surface are provided so as to extend in the circumferential direction of said tire, said two primary grooves and said sub-grooves defining a plurality of blocks;

wherein a total width of said two primary grooves is set to 12–16% of the ground-contacting width of said tire, said sub-grooves positioned in said center portion having a V-shape diverging in the anti-rotational direction of said tire which is reverse to a designated rotational direction of said tire, said V-shape of said sub-grooves having an angle α of bend of 50°–80°, said sub-grooves positioned in said two shoulder portions being extended to the ground contacting ends of said tire and having an angle β measured in the anti-rotational direction of said tire with respect to the circumferential direction thereof of 60°–90°; and wherein quasi-sub-grooves extending from said sub-grooves in said two shoulder portions in the anti-rotational direction of said tire up to said ground contacting ends thereof are provided at a predetermined pitch in the circumferential direction of said tire.

2. A pneumatic tire according to claim 1, wherein V-shaped blocks defined by said V-shape sub-grooves provided in said center portion and said primary grooves are divided into a plurality of small blocks by narrow grooves extending in the widthwise direction of said tire.

3. A pneumatic tire according to claim 1, wherein said center portion of said tread surface is radially offset so that said center portion is in an inner position in a radial direction of said tire as compared with said two shoulder portions.

4. A pneumatic tire according to claim 3, wherein an off-set amount of said center portion is set to not more than 3 mm.

5. A pneumatic tire according to claim 1, wherein said tire has two belt layers buried in a part of a tread portion which is on the outer side of a carcass, one of said belt layers being divided in a central region of said tire into left and right parts.

6. A pneumatic tire according to claim 5, wherein reinforcing cords for one of said belt layers are formed out of organic fiber, reinforcing cords for the other belt layer being formed by steel cords.

7. A pneumatic tire according to claim 6, wherein said organic fiber is aramid fiber.

8. A pneumatic tire according to claim 6, wherein a total denier of said reinforcing cords comprising organic fiber is set to 500–6000.

9. A pneumatic tire according to claim 1, wherein said center portion of said tread surface extends from a center line CL of said tire to left and right as much as 15–25% respectively of a ground contacting width W of said tire.

* * * * *